United States Patent
Wilson et al.

(10) Patent No.: US 10,911,909 B1
(45) Date of Patent: *Feb. 2, 2021

(54) TEXT MESSAGE CONTROL SYSTEM

(71) Applicant: Allstate Insurance Company, Northbrook, IL (US)

(72) Inventors: Thomas J. Wilson, Chicago, IL (US); Edward A. Biemer, Eastbourne (GB)

(73) Assignee: Allstate Insurance Company, Northbrook, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/713,642

(22) Filed: Dec. 13, 2019

Related U.S. Application Data

(63) Continuation of application No. 15/652,923, filed on Jul. 18, 2017, now Pat. No. 10,542,393, which is a continuation of application No. 14/573,800, filed on Dec. 17, 2014, now Pat. No. 9,743,260.

(51) Int. Cl.
*H04W 4/14* (2009.01)
*H04W 8/22* (2009.01)

(52) U.S. Cl.
CPC .................................. *H04W 4/14* (2013.01)

(58) Field of Classification Search
CPC .................................. H04W 4/14; H04W 8/22
See application file for complete search history.

(56) References Cited

U.S. PATENT DOCUMENTS

| | | |
|---|---|---|
| 6,973,333 B1 | 12/2005 | O'Neil |
| 7,277,780 B2 | 10/2007 | Meier-Arendt et al. |
| 7,856,203 B2 | 12/2010 | Lipovski et al. |
| 8,315,617 B2 | 11/2012 | Tadayon et al. |
| 8,527,013 B2 | 9/2013 | Guba et al. |

(Continued)

FOREIGN PATENT DOCUMENTS

| | | |
|---|---|---|
| AU | 2012258326 A1 | 12/2012 |
| EP | 2119208 A1 | 11/2009 |

(Continued)

OTHER PUBLICATIONS

"Smart driving is now rewarding" http://drivescribe.com/ Drive Power, LLC, visited Aug. 13, 2014.

(Continued)

*Primary Examiner* — Muthuswamy G Manoharan
(74) *Attorney, Agent, or Firm* — Banner & Witcoff, Ltd.

(57) ABSTRACT

Methods, computer-readable media, software, and apparatuses provide a system for controlling access to text messaging capabilities of a mobile computing device of a user while the user is driving. The mobile computing device may be configured to restrict a user from sending or receiving text messages while the user is driving depending on a current driving situation. Whether a user can send or receive text messages may further depend on a priority of the text message or a priority level of a sender or intended recipient of the text message. The system may include devices for collecting information regarding the vehicle and its surroundings and for determining the current driving situation based on the collected information. Further, the system may include devices for maintaining records of the restrictions placed on text messaging and of rewards earned for agreeing to be subject to such restrictions.

20 Claims, 6 Drawing Sheets

(56) References Cited

U.S. PATENT DOCUMENTS

| | | |
|---|---|---|
| 8,538,402 B2 | 9/2013 | Vidal et al. |
| 8,594,705 B2 | 11/2013 | Osann, Jr. |
| 8,666,382 B2 | 3/2014 | Silver |
| 8,744,492 B2 | 6/2014 | Kuo |
| 8,787,949 B2 | 7/2014 | Sumcad et al. |
| 9,042,873 B2 | 5/2015 | Basir |
| 2006/0030264 A1* | 2/2006 | Morris ............... H04L 67/24 455/41.2 |
| 2009/0240497 A1 | 9/2009 | Usher et al. |
| 2010/0035632 A1* | 2/2010 | Catten ............... H04W 24/08 455/456.1 |
| 2010/0148920 A1 | 6/2010 | Philmon et al. |
| 2010/0210254 A1 | 8/2010 | Kelly et al. |
| 2010/0216509 A1* | 8/2010 | Riemer ............ H04M 1/72577 455/557 |
| 2010/0297929 A1 | 11/2010 | Harris |
| 2010/0330975 A1 | 12/2010 | Basir |
| 2011/0076996 A1 | 3/2011 | Burton et al. |
| 2011/0077028 A1 | 3/2011 | Wilkes, III et al. |
| 2011/0077032 A1 | 3/2011 | Correale et al. |
| 2011/0195699 A1* | 8/2011 | Tadayon ............ H04B 5/0062 455/418 |
| 2011/0264246 A1 | 10/2011 | Pantoja et al. |
| 2011/0269441 A1 | 11/2011 | Silver |
| 2011/0294520 A1 | 12/2011 | Zhou et al. |
| 2012/0250517 A1 | 10/2012 | Saarimaki et al. |
| 2012/0315850 A1 | 12/2012 | Oman et al. |
| 2013/0260690 A1* | 10/2013 | Cha .................. H04B 7/26 455/41.2 |
| 2014/0012878 A1 | 1/2014 | Moussavian et al. |
| 2014/0057610 A1 | 2/2014 | Olincy et al. |
| 2014/0149145 A1* | 5/2014 | Peng ................. G06F 3/0346 705/4 |
| 2014/0378060 A1 | 12/2014 | Akama |
| 2014/0379920 A1* | 12/2014 | Nathwani ............ H04W 4/20 709/226 |
| 2015/0099495 A1 | 4/2015 | Crosbie et al. |
| 2015/0341290 A1 | 11/2015 | Cherifi et al. |
| 2016/0094707 A1* | 3/2016 | Stuntebeck ....... H04M 1/72577 455/418 |
| 2017/0201619 A1* | 7/2017 | Cohen ............... H04M 1/6075 |

FOREIGN PATENT DOCUMENTS

| | | |
|---|---|---|
| WO | 2008082351 A1 | 7/2008 |
| WO | 2008084213 A1 | 7/2008 |
| WO | 2009064132 A2 | 5/2009 |

OTHER PUBLICATIONS

"DriveSafe.ly" http://www.drivesafe.ly/ visited Aug. 13, 2014.
"Textecution" http://www.textecution.com/index.php Jonathan Young Enterprises, LLC, visited Aug. 13, 2014.
"Text Blocker: Cell Control" http://www.scosche.com/cellcontrol-safe-driving-system-for-cell-phones Scosche Industires 2014.
Jessica Dolcourt, "iZUP app locks our texting while driving" http://www.cnet.com/news/izup-app-locks-out-texting-while-driving/ Oct. 9, 2009, 3 pages.
"Drive Alive" http://www.ddfn.org/pdfs/DDFNdocumentDriveAlive.pdf visited Dec. 17, 2014.
"LifeSaver" http://www.lifesaver-app.com/nddtsea Life Apps LLC, visited Dec. 17, 2014.
"AT&T Drive Mode" www.att.com/drivemode AT&T Intellectual Property 2013.
"text-STAR" http://www.text-star.com/index.html#header_wrapper text-STAR 2014, visited on Aug. 13, 2014.
Mar. 24, 2016—U.S. Non Final Office Action—U.S. Appl. No. 14/573,800.
Jul. 12, 2016—U.S. Office Action—U.S. Appl. No. 14/573,800.
Nov. 2, 2016—U.S. Office Action—U.S. Appl. No. 14/573,800.
Apr. 19, 2017—U.S. Notice of Allowance—U.S. Appl. No. 14/573,800.
Nov. 30, 2017—U.S. Non-Final Office Action—U.S. Appl. No. 15/652,923.
Jul. 9, 2018—U.S. Non-Final Office Action—U.S. Appl. No. 15/652,923.
Dec. 21, 2018—U.S. Non-Final Office Action—U.S. Appl. No. 15/652,923.
Apr. 9, 2019—U.S. Final Office Action—U.S. Appl. No. 15/652,923.
Sep. 9, 2019—U.S. Notice of Allowance—U.S. Appl. No. 15/652,923.

\* cited by examiner

TEXT MESSAGE CONTROL SYSTEM

CROSS-REFERENCE TO RELATED APPLICATIONS

This application is a continuation of and claims priority to U.S. patent application Ser. No. 15/652,923, which was filed on Jul. 18, 2017 and is a continuation of and claims priority to U.S. patent application Ser. No. 14/573,800, which was filed on Dec. 17, 2014 and entitled "TEXT MESSAGE CONTROL SYSTEM" (now U.S. Pat. No. 9,743,260, issued on Aug. 22, 2017). The aforementioned applications are hereby incorporated by reference herein in their entirety.

FIELD OF ART

Aspects of the disclosure generally relate to methods and computer systems, including one or more computers particularly configured and/or executing computer software. More particularly, aspects of this disclosure relate to a system for controlling incoming and outgoing text messages based on a current driving situation.

BACKGROUND

In today's society, many people carry mobile computing devices, such as cell phones, tablets, etc., with them. Use of such mobile computing devices continues to increase. Mobile computing devices are used by people in various places throughout much of their day. In particular, mobile computing devices are used by people when traveling in a vehicle, such as a car, truck, motorcycle, etc. At times, drivers of a vehicle may use a mobile computing device while driving. In some cases, use of mobile computing devices by drivers while driving has led to accidents because such use may be a distraction. Use of mobile computing devices to read or send text messages may especially be distracting to drivers and lead to accidents. Typically, sending and reading text messages requires a user to press keys/buttons on a keypad or touch-screen of a mobile phone. As such, drivers that send and read text messages while driving often take their eyes off the road and hands off the steering wheel to look at their mobile phone and type.

In recent years, text messaging has become a popular way to communicate. As such, more and more drivers are sending and reading text messages, e.g., short message system (SMS) messages, multimedia messaging service (MMS) messages, etc., while driving and getting into accidents as a result. Recognizing that text messaging plays a role in causing accidents, many people and organizations have spoken out against "texting" while driving. Despite the warnings, some drivers continue to succumb to the temptation to use their mobile computing devices while driving. Little, if anything, has been done to prevent drivers from texting and/or incentivize drivers not to text. While asking drivers to turn off or refrain from using their mobile computing devices while driving is a step in the right direction, more practical solutions to address the problems with texting while driving are desired.

Accordingly, new systems, devices, methodologies, and software are desired to limit or block access to text messaging capabilities by drivers while driving.

BRIEF SUMMARY

In light of the foregoing background, the following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

Aspects of the disclosure address one or more of the issues mentioned above by disclosing methods, computer readable storage media, software, systems, and apparatuses for providing a text messaging control system that may place restrictions on a user's ability to send and/or receive text messages while driving. The system allows the restrictions to be modified on the fly in accordance with a current driving situation. The restrictions may also depend on a priority level of the sender or intended recipient of a text message. As such, important text messages may still be received or sent regardless of the current driving situation. Further, the restrictions may also depend on a priority level of the text message itself. Thus, high priority text messages may also be received or sent regardless of the current driving situation.

Aspects of this disclosure provide a system comprising a mobile computing device (e.g., cell phone, tablet, personal digital assistant, etc.) associated with a vehicle and a network computing device (e.g., a server). The mobile computing device may comprise a cellular network interface configured to receive or send a text message over a cellular network. Meanwhile, the network computing device may comprise a network interface. The network computing device may be configured to obtain, from the mobile computing device or another network computing device, information indicating a driving situation related to the vehicle at a time at which the mobile computing device receives a particular text message. Further, the network computing device may be configured to determine an access level based on the obtained information, and to transmit the access level to the mobile computing device. The mobile computing device may be configured to determine a priority level of the particular text message or of a sender of the particular text message. The mobile computing device may also be configured to determine whether to output the particular text message based on the access level and the priority level.

Aspects of the disclosure also provide the computing devices of the system as well as the computer readable media of those computing devices that store text message control programs. Specifically, aspects of the disclosure provide a computing device, comprising a network interface configured to communicate with a server and a mobile computing device while the mobile computing device is traveling within a vehicle. The computing device may also include at least one processor. The at least one processor may be configured to execute computer-executable instructions (e.g., a text message control program) stored on computer readable media. The at least one processor may also be configured to cause (or control) the computing device to obtain, from the server, information indicating a driving situation related to the vehicle at a time at which the mobile computing device receives a particular text message. Further, the at least one processor may be configured to cause the computing device to determine, based on the obtained information, an access level for controlling how the mobile computing device outputs the particular text message; and to transmit the access level to the mobile computing device. The mobile computing device may then restrict access to text messaging capabilities/features based on the received access level.

Aspects of the disclosure further provide a method of determining whether a user is a driver of a vehicle; and determining a driving situation with respect to the vehicle based on information obtained from a device on the vehicle and information obtained from a server remote from the vehicle. Determining the driving situation may include calculating a score that quantifies a degree of safety of a current driving situation. The method may also include determining a priority level of a sender of an incoming text message or an intended recipient of an outgoing text message; determining, based on the driving situation and priority level, a level of access to text messaging capabilities of a mobile computing device associated with the driver of the vehicle; and controlling access to the text messaging capabilities of the mobile computing device in accordance with the level of access. Controlling access to the text messaging capabilities may include blocking the driver from typing the outgoing text message and allowing the driver to generate the outgoing text message by speaking. Additionally, or alternatively, controlling access to the text messaging capabilities may include converting the incoming text message into an audio message and playing the audio message for the driver to hear.

Of course, the methods and systems of the above-referenced embodiments may also include other additional elements, steps, computer-executable instructions, or computer-readable data structures. In this regard, other embodiments are disclosed and claimed herein as well. The details of these and other embodiments of the present invention are set forth in the accompanying drawings and the description below. Other features and advantages of the invention will be apparent from the description, drawings, and claims.

BRIEF DESCRIPTION OF THE DRAWINGS

The present invention is illustrated by way of example and is not limited by the accompanying figures in which like reference numerals indicate similar elements and in which.

DETAILED DESCRIPTION

Figure 1:
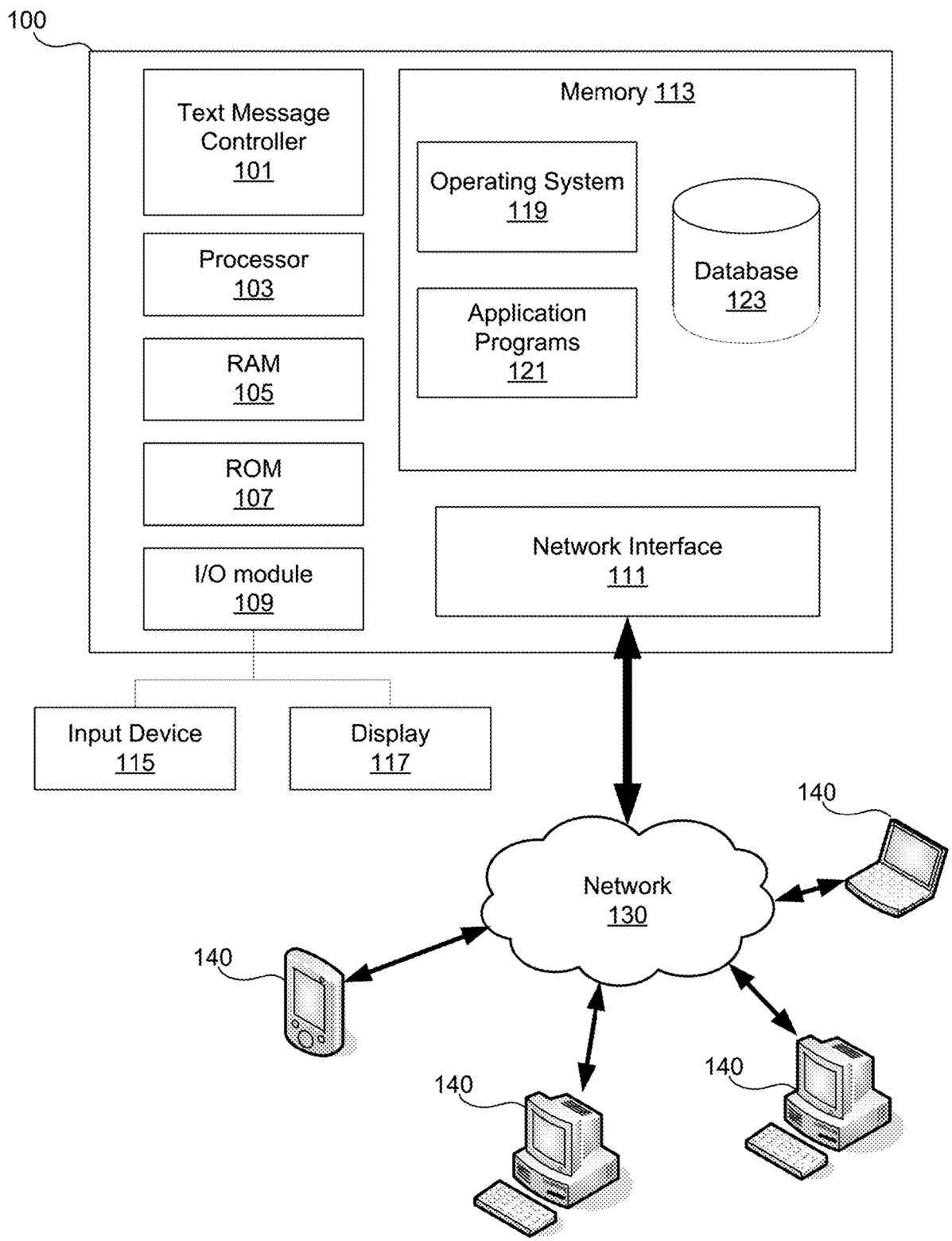
FIG. 1 is a block diagram of an example computing device that may be used according to an illustrative embodiment of the present disclosure.

In accordance with various aspects of the disclosure, methods, computer-readable media, software, and apparatuses are disclosed that provide a text message control system for controlling access to text messaging features/capabilities of a mobile computing device. In particular, the text message control system may limit a person's ability to read incoming text messages and/or ability to send text messages while operating a vehicle. For example, the text message control system may limit a driver of a car from reading a text message or sending a text message while driving. Herein, text messages may include short message system (SMS) messages, multimedia messaging service (MMS) messages, or the like.

In some examples, text messaging features/capabilities may be controlled on-the-fly based on real-time data and/or historical data. For example, one minute a current driving situation may be deemed risky and therefore text messaging may be limited, and the next minute the current driving situation may be deemed safe and therefore full text messaging may be allowed. Here, a minute interval is used as an example. Other time periods (greater or less than a minute) may be used to dictate the frequency at which a driving situation is evaluated. In some embodiments, for example, text messaging capability may be determined as text messages are received or as attempts are made to send text messages.

The text message control system may also provide features to incentivize drivers to cooperate in limiting access to text messaging capabilities. For example, the text messaging control system may determine and provide discounts on insurance to drivers that limit their text messaging while driving. Accordingly, the text message control system may be deployed by an insurance company (or on behalf of an insurance company) with access to insurance information.

In some embodiments, the text message control system may determine whether a text message can be accessed and what level of access will be allowed based on one or more factors. Such factors or criteria may include: the safety of the current driving situation, the priority level of the message, and/or the priority level of the person sending the message (e.g., family members may have a higher priority than friends who may have a higher priority than acquaintances).

In some embodiments, the text message control system may allow various levels of access to text messages. For example, the system may allow incoming text messages to be received by voice and/or allow outgoing text messages to be generated by voice. In some examples, the system may also allow for a vocal review of outgoing voice text messages prior to the outgoing voice message being sent. The level of access that is allowed with respect to a particular text message may depend on safety criteria of a current driving situation and priority criteria for the particular text message. In some embodiments, when driving situations are deemed to be relatively safe (e.g., have few distractions), all types of text messaging may be allowed or all types of voice messaging (e.g. verbally creating a text message) may be allowed. In contrast, in some embodiments, when driving situations are deemed relatively unsafe (e.g., have more distractions), only high priority voice texts may be received and no outgoing voice texts may be created. In some embodiments, if a certain low-safety driving situation is recognized, no voice texts may be received or sent.

Further, the text message control system may determine the relative safety of the driving situation based on a variety of factors, including current driving conditions such as a speed of the vehicle, a number of vehicles nearby and/or a speed of nearby vehicles (e.g., traffic conditions), a relative speed of a vehicle in relation to nearby vehicles, weather conditions, road conditions (e.g., a type of road), a noise level in the vehicle, past driving behavior of a driver of the vehicle (e.g., frequency of hard-braking, over-acceleration, or hard-turning). The text message control system may also use insurance information and analyze previous accidents and/or previous insurance claims to determine the safety of the current driving condition. Previous accidents and insurance claims may be analyzed for a particular road the driver is driving on and driving characteristics of the current trip (e.g., a speed of the vehicle, number of vehicles nearby, etc.).

A driver may be provided discounts and rewards for agreeing to participate in a text message limiting service provided by text message control system. The discounts may include a reduced insurance premium, a reduced rate on a phone bill, or a gift given directly to the driver (e.g., money, gift cards, etc.). The discounts and rewards may be tracked and distributed intermittently (e.g., monthly, quarterly, semi-annually, annually, etc.). In some examples, the rewards may include increased amounts of insurance coverage for a particular item (e.g., increased amount of coverage on a vehicle) or insurance coverage for other items (e.g., a home, jewelry, etc.). The rewards may also include free items/services or discounted items/services from partners with of a company or organization (e.g., an insurance company) that maintains or deploys the text message control system. For example, a driver participating in the text message control system may earn discounts on car maintenance from a mechanic partnering with an insurance company or discounts on a smoke detector/fire extinguisher from a store partnering with the insurance company.

As a result of aspects described herein, text message capabilities/features may be controlled on-the-fly so that they may be limited when users are driving. Consequently, aspects of this disclosure may lead to a reduction in traffic accidents, which may lead to a reduction in costs of insurance companies, which in turn may translate into lower rates for customers of insurance companies.

In the following description of the various embodiments of the disclosure, reference is made to the accompanying drawings, which form a part hereof, and in which is shown by way of illustration, various embodiments in which the disclosure may be practiced. It is to be understood that other embodiments may be utilized and structural and functional modifications may be made.

In one or more arrangements, teachings of the present disclosure may be implemented with a computing device. FIG. 1 illustrates a block diagram of an example computing device 100 that may be used according to an illustrative embodiment of the present disclosure. The computing device 100 may be similar to any available computing device, such as a personal computer (e.g., a desktop computer), server, laptop computer, notebook, tablet, smartphone, etc. The computing device 100 may have a text message controller 101 for performing methods and executing instructions of the text message control program described herein. The text message controller 101 may be implemented with one or more processors and one or more storage units (e.g., databases, RAM, ROM, and other computer-readable media), one or more application specific integrated circuits (ASICs), and/or other hardware components. Throughout this disclosure, the text message controller 101 may refer to the software and/or hardware used to implement the text message controller 101. The one or more processors of the text message controller 101 may operate in addition to or in conjunction with another general processor 103 of the computing device 100. Both the text message controller 101 and the processor 103 may be capable of controlling operations of the computing device 100 and its associated components, including RAM 105, ROM 107, an input/output (I/O) module 109, a network interface 111, and memory 113.

The I/O module 109 may be configured to be connected to an input device 115, such as a microphone, keypad, keyboard, touchscreen, and/or stylus through which a user of the computing device 100 may provide input data. The I/O module 109 may also be configured to be connected to a display device 117, such as a monitor, television, touchscreen, etc., and may include a graphics card. The display device 117 and input device 115 are shown as separate elements from the computing device 100, however, they may be within the same structure. Using the input device 115, system administrators may update various aspects of the text message control program, such as rules for determining a current driving situation, rules for determining a priority of a message, rules for determining a priority of a sender, rules for determining a level of access to text messages (incoming or outgoing), etc. On some computing devices 100, the input device 115 may be operated by users (e.g., customers) to interact with the text message control program, including providing user information and/or preferences related to settings for defining which senders should be given which priority levels, settings for defining thresholds for determining when to block or allow text messages, and settings for determining whether to require confirmation of a voice message when using voice messages to replace outgoing text messages, etc. (as described in further detail below). Meanwhile, the display device 117 may assist the system administrators and users to confirm/appreciate their inputs.

The memory 113 may be any computer readable medium for storing computer executable instructions (e.g., software). The instructions stored within memory 113 may enable the computing device 100 to perform various functions. For example, memory 113 may store software used by the computing device 100, such as an operating system 119 and application programs 121, and may include an associated database 123.

The network interface 111 allows the computing device 100 to connect to and communicate with a network 130. The network 130 may be any type of network, including a local area network (LAN) and/or a wide area network (WAN). For example, the network may include one or more of a variety of networks, such as the Internet, a cellular network, satellite network, or public switched telephone network. Through the network 130, the computing device 100 may communicate with one or more other computing devices 140, such as laptops, notebooks, smartphones, personal computers, servers, etc. The computing devices 140 may also be configured in a similar manner as computing device 100. In some embodiments the computing device 100 may be connected to the computing devices 140 to form a "cloud" computing environment.

The network interface 111 may connect to the network 130 via communication lines, such as coaxial cable, fiber optic cable, etc. or wirelessly using a cellular backhaul or a wireless standard, such as IEEE 802.11, IEEE 802.15, IEEE 802.16, etc. In some embodiments, the network interface may include a modem. Further, the network interface 111 may use various protocols, including TCP/IP, Ethernet, File Transfer Protocol (FTP), Hypertext Transfer Protocol (HTTP), etc., to communicate with other computing devices 140. In some embodiments, the computing device may include multiple network interfaces 111 for communicating using different protocols or standards or over different networks.

FIG. 1 is an example embodiment of a computing device 100. In other embodiments, the computing device 100 may include fewer or more elements. For example, the computing device 100 might not include the processor 103 in addition to one or more processors of the text message controller 101. On the other hand, the computing device 100 may be a mobile device (e.g., a smartphone, tablet, etc.), and thus, may also include various other components, such as a battery, speaker, and/or antennas (not shown). Also, the computing device 100 may be a vehicle computing device 100 (either installed by a vehicle manufacturer or as an aftermarket part) having vehicle compatible elements, such as a port for an on-board diagnostic connector or ports for other vehicle sensors (e.g., tire pressure sensors, engine temperature sensors, etc.).

Figure 2:
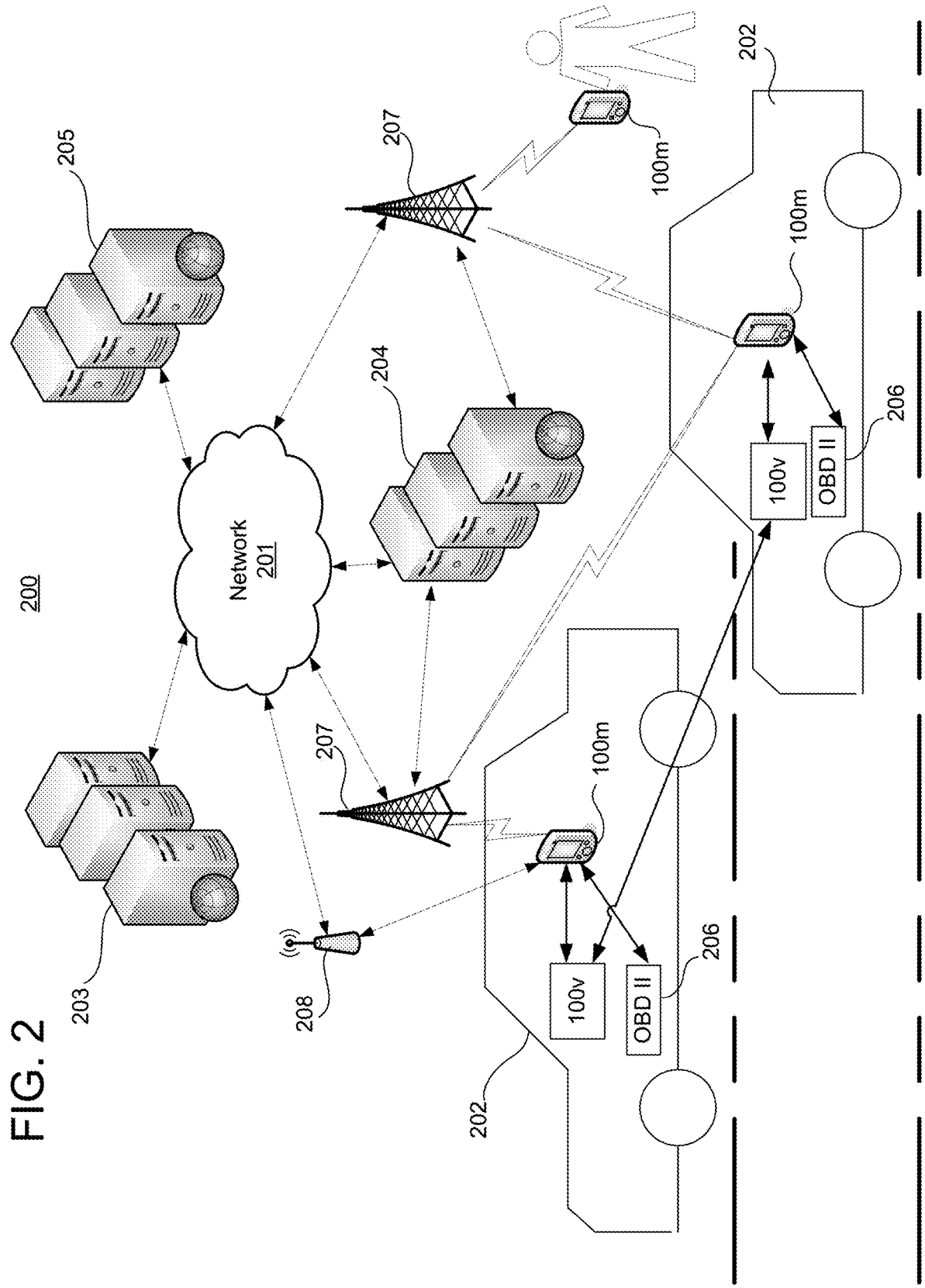
FIG. 2 illustrates an example network environment in which a system in accordance with the present disclosure may be implemented.

The methods and software for controlling access to text messaging capabilities/features as disclosed herein may be implemented on one or more computing devices 100 used in various network environments. FIG. 2 illustrates an example network environment 200 for implementing methods according to the present disclosure. As shown in FIG. 2, the network environment 200 may include a network 201 configured to connect computing devices (e.g., mobile computing devices 100m) within or associated with vehicles 202, one or more third party servers 203, one or more service provider servers 204, and one or more text message control servers 205. Collectively, these computing devices may form a text message control system. The network 201 may be any type of network, like the network 130 described above, and use one or more communication protocols (e.g., protocols for the Internet (IP), Bluetooth, cellular communications, satellite communications, etc.) to connect computing devices and servers within the network environment 300 so they may send and receive communications between each other. In particular, the network 201 may include a cellular network and its components, such as cell towers. Accordingly, for example, a mobile computing device 100m (e.g., a smartphone) of a person in a vehicle 202 may communicate, via a cellular backhaul of the network 201, with a text message control server 205 to determine whether to limit or block access to text messaging capabilities. While FIG. 2 illustrates that the mobile computing devices 100m may connect to the network 201 while within vehicles 202, it should be understood that these same mobile computing devices 100m may connect to the network 201 even if they are removed from the vehicles 202. For example, a mobile computing device 100m being used by a user that is not driving may connect to the network 201. In an aspect of the present application, a text message that would have been permitted to be sent to a mobile computing device 100m in possession of a user that is not driving (e.g., a passenger or person not in a vehicle), may be blocked from being sent to a driver of a vehicle 202. In some examples, the same text message may be blocked for one person and sent to another. For example, a group text message (intended for multiple recipients) may be allowed to be received by one intended recipient who is not driving, but may be blocked from being received by another recipient who is driving.

FIG. 2 illustrates two vehicles 202. However, the text message control system may be configured to communicate with computing devices in more vehicles 202 (in particular, in a large volume of vehicles 202) simultaneously so that it may limit texting for multiple drivers simultaneously. Also, although FIG. 2 depicts the vehicles 202 as cars, the vehicles 202 may be any type of vehicle, including a motorcycle, bicycle, scooter, drone (or other automated device), truck, bus, boat, plane, helicopter, etc. Further, although FIG. 2 depicts the vehicles 202 being in close proximity to each other, it should be understood that the vehicles 202 may be in separate locations (e.g., such that they cannot communicate directly with each other).

FIG. 2 also illustrates an example subsystem within the network environment 200. Specifically, FIG. 2 illustrates an example arrangement of computing devices that may exist within one or more of the vehicles 202. As shown in FIG. 2, a vehicle 202 may include a mobile computing device 100m, a vehicle computing device 100v, and an on board diagnostic (OBD) device 206 having an on board diagnostic connector (e.g., an OBD II port). The mobile computing device 100m may be carried into the vehicle 202 by a person. In some cases, more than one mobile computing device 100m may be in a vehicle 202. For example, both a driver and passenger may have their own mobile computing devices 100m that they carry with them into the same vehicle 202. The mobile computing device 100m may be any mobile computing device (e.g., a smartphone, tablet, etc.) that is associated with a driver or passenger of the vehicle 302. The mobile computing device 100m may be configured in a similar manner to the computing device 100 of FIG. 1. Further, the mobile computing device 100m may be configured to execute a text message control program that limits (or blocks) text messaging capabilities and/or provides a user interface for a user to provide inputs to and receive outputs from the text message control system. Such a client-side text message control program may be downloaded or otherwise installed onto the mobile computing device 100m using known methods. Once installed onto the mobile computing device 100m, a user may launch the client-side text message control program by, for example, operating buttons or a touchscreen on the mobile computing device 100m. Additionally, or alternatively, the mobile computing device 100m may be configured to execute a web browser (e.g., an application for accessing and navigating the Internet) to access a web page providing an interface for the text message control system. In some embodiments, the mobile computing device 100m may also be configured to collect drive data using, e.g., its accelerometer, GPS, gyroscope, etc. Drive data may include vehicle telematics data or any other data related to events occurring during a vehicle's trip (e.g., an impact to a part of the vehicle, a deployed airbag, etc.). Drive data may also include location information, such as GPS coordinates, indicating the geographical location of the mobile computing device 100m.

Although FIG. 2 depicts each vehicle 202 having at least one mobile computing device 100m, there might not be a mobile computing device 100m in some vehicles 202. For example, the people in a vehicle 202 might not have a mobile computing device 100m or might have left their mobile computing device 100m elsewhere. Also, if the vehicle is autonomous, there might not be any mobile computing device 100m. In some embodiments, the text message control system may limit or block text messaging capabilities of a mobile computing device 100m of an operator of an autonomous vehicle (e.g., drone pilot).

In some embodiments, the mobile computing device 100m may communicate (e.g., via Bluetooth) with a vehicle computing device 100v. As mentioned above and as shown in FIG. 2, a vehicle 202 may include a vehicle computing device 100v. The vehicle computing device 100m may be configured in a similar manner to the computing device 100 of FIG. 1. Further, the vehicle computing device 100v may be configured to execute the client-side text message control program that facilitates collection of data used to determine the current driving situation with respect to the vehicle. Such a client-side text message control program may be downloaded or otherwise installed onto the vehicle computing device 100v using known methods. Once installed onto the vehicle computing device 100v, a user may launch the client-side text message control program by, for example, operating buttons or a touchscreen on the dashboard of the corresponding vehicle 202. In some examples, the client-side text message control program may be automatically launched whenever the vehicle 202 is started or put in gear. Additionally, or alternatively, the vehicle computing device 100v may be configured to execute a web browser to access a web page providing an interface for the text message control system. In some embodiments, the vehicle computing device 100v may be configured to collect drive data using, e.g., its accelerometer, GPS, gyroscope, etc. As mentioned above, this drive data may include vehicle telematics data or any other data related to events occurring during a vehicle's trip (e.g., an impact to a part of the vehicle, a deployed airbag, or other event triggered by a sensor of the vehicle). The vehicle 202 may have a GPS installed therein, and therefore, the vehicle computing device 100v may also collect GPS coordinates.

Moreover, in some embodiments, the vehicle computing device 100v may be configured to collect drive data from other nearby vehicles 202. For example, as shown in FIG. 2, a vehicle computing device 100v of one vehicle 202 may directly communicate with a vehicle computing device 100v of another vehicle 202. Standards for implementing such vehicle-to-vehicle communication are expected to be developed. Any such standards may be used by one vehicle computing device 100v to collect drive data from another vehicle computing device 100v. Further, any information collected by a vehicle computing device 100v may be shared with a mobile computing device 100m within the same vehicle via, e.g., a Bluetooth or other local connection.

Further, the vehicle computing device 100v may be a system including multiple devices. For example, the vehicle computing device 100v may include a microphone and/or speakers for allowing a user to make or receive a phone call or record a voice message (e.g., in lieu of a text message). The voice data for the phone call or voice message may be communicated between the vehicle computing device 100v and the mobile computing device 100m via, for example, a Bluetooth or other local connection. In this manner, the vehicle computing device 100v may provide a means for allowing drivers to use their mobile computing devices 100m (e.g., phones) without using their hands. Additionally, the vehicle computing device 100v may include or be configured to interface with one or more vehicle sensors (e.g., fuel gauge, tire pressure sensors, engine temperature sensors, etc.).

In some embodiments, one or more of the vehicles 202 may be autonomous or in an autonomous mode (e.g., auto-pilot mode). An autonomously controlled vehicle 202 may be controlled by its vehicle computing device 100v and/or a remote computing device. The vehicle computing device 100v may employ sensors for inputting information related to a vehicle's surroundings (e.g., distance from nearby objects) and use the inputted information to control components of the vehicle s 202 to steer the vehicle 202.

The vehicle computing device 100v may also interface with the mobile computing device 100m via a wired connection (e.g., USB) or via the OBD device 206. The OBD device 206 may be connected to the OBD II connector/port of the vehicle 202, which is typically located beneath the steering wheel of the vehicle 202. The OBD device 206 may facilitate sharing of drive data collected by the vehicle computing device 100v with the mobile computing device 100m. In some embodiments, the OBD device 206 may be used to collect drive data itself. For example, the OBD device 206 may include a GPS receiver, accelerometer, gyroscope, etc. in order to collect GPS coordinates, acceleration data, deceleration data, turning data, etc. Also, the OBD device 206 may include a microphone to collect audio data from within the vehicle 202 to determine a noise level within the vehicle.

Still referring to FIG. 2, the mobile computing devices 100m may communicate with other devices of the text message control system (e.g., third party servers 203, service provider servers 204, and/or text message control servers 205) via the network 201. As shown in FIG. 2, the mobile computing devices 100m may connect to the network 201 via a cell tower 207 or access point 208. For example, a mobile computing device 100m may transmit and receive cellular signals via a cell tower 207 so that the mobile computing device 100m may communicate with the text message control system while traveling in a moving vehicle 202. Text messages may be sent to/from the mobile computing devices 100m via the cell towers 207 of a cellular backhaul at various times, and in particular when the mobile computing devices 100m are traveling within vehicles 202. In addition, mobile computing devices 100m may send/receive other information via the cell towers 207. For example, a mobile computing device 100m may receive traffic information (which may be used to determine whether to limit text messages as described herein) from a third party server 203 via a cell tower 207 providing cellular coverage to an area in which the mobile computing device 100m is located. Although only one access point 208 is shown in FIG. 2, additional access points may be used. In some cases, information may be relayed via multiple access points 208.

Additionally, or alternatively, a mobile computing device 100m may transmit and receive other wireless signals (e.g., WiFi signals) to/from access points 208 set up along roads, highways, etc. so that the mobile computing device 100m may communicate with the text message control system while traveling in a moving vehicle 202. For example, a mobile computing device 100m may receive weather information (which may be used to determine whether to limit text messages as described herein) from a third party server 203 via an access point 208 as the vehicle 202 carrying the mobile computing device 100m passes the access point 208. In some cases, information may be relayed via multiple cell towers 207 to reach a mobile computing device 100m.

FIG. 2 also illustrates third party servers 203. Herein, a server may refer to any network computing device specially configured to communicate over a network and/or any other type of computing device. The third party servers 203 may be owned or controlled by various entities that have been tasked with or employed to collect or enter data that may be used as a factor in determining whether to limit or block text messages as described herein. For example, a third party server 203 may be a server of a company that collects or generates weather information or a server of a government office/agency that provides accident reports. The third party servers 203 may be configured in a similar manner as the computing device 100 of FIG. 1. In some embodiments, the third party servers 203 may be particularly configured to handle (e.g., receive and response to) a large volume of requests for information. The third party servers may store or be connected to databases that store various types of information that may be used to evaluate a driving situation. For example, third party servers 203 may provide weather information for determining weather conditions, traffic information for determining traffic conditions, road information (including road maps) for determining road conditions, construction information for determining construction zones, etc. Although FIG. 2 depicts the third party servers as being collocated, it should be understood that the third party servers 203 may be at separate locations. For example, one third party server 203 at a first location may provide weather information, while another third party server 203 at a second location (separate from the first location) may provide traffic information.

The third party servers 203 may receive location information (e.g., GPS coordinates) corresponding to a location of a mobile computing device 100m, determine relevant information for that location, and return the relevant information to the requesting mobile computing device 100m (or another appropriate device in the system) via the network 201. The third party servers 203 may execute a server-side text messaging control program for handling requests so that requests are properly parsed and responses are properly packaged for delivery to mobile computing devices 100m, service provider computing devices 204, and/or text message control servers 205.

FIG. 2 also illustrates service provider servers 204. The service provider servers 204 may be configured in a similar manner as the computing device 100 of FIG. 1. In some embodiments, the service provider servers 204 may include or be a part of a subsystem including components of a cellular network (e.g., Global System for Mobile Communications (GSM) network), such as base stations or a mobile switching center (MSC). In some embodiments, the service provider servers 204 may be configured to connect one or more cellular backhaul systems (including cell towers 207) with other components of the text message control system (e.g., third party servers 203 and text message control servers 205). For example, a mobile computing device 100m may want insurance related information while it is in a moving vehicle 202, and therefore, may send a cellular signal to a nearby cell tower 207 requesting such information. The cell tower 207 may relay the cellular signal to a service provider computing device 204, which may decode/demodulate the cellular signal and produce a different signal (e.g., IPv4/IPv6 packet) that may be received by the text message control servers 205. The service provider computing device 204 may also receive signals in particular formats from text message control servers 205 (or third party servers 203) and generate cellular signals that may be used to transfer information to mobile computing devices via cell towers 207.

The service provider computing devices 204 may be maintained, controlled, and/or owned by cellular network providers (e.g., AT&T, VERIZON, etc.). Different service provider computing devices 204 may be used for different cellular network providers.

As disclosed herein, delivery of text messages may be blocked or limited. In some embodiments, the service provider computing devices 204 may perform the blocking or limiting. For example, a service provider computing device 204 may stop a text message from being delivered to a particular mobile computing device 100m of a driver of a vehicle 202. In some examples, the service provider computing devices 204 may itself determine whether blocking or limiting text messages is appropriate (e.g., based on data received from a mobile computing device 100m, third party server 203, and/or text message control server 205). Alternatively, in some examples, the service provider servers 204 may determine whether to perform such blocking or limiting in response to receiving an instruction/command from a mobile computing device 100m or text message control server 205.

FIG. 2 also depicts text message control servers 205. The text message control servers 205 may belong to an insurance company that provides insurance (e.g., automotive insurance), or to another company that manages and maintains the text message control servers 205 on behalf of (or for providing a service to) an insurance company. The text message control servers 205 may be configured in a similar manner as the computing device 100 of FIG. 1. The text message control servers 205 may be specially configured (e.g., programmed) to communicate with mobile computing devices 100m. In particular, the text message control servers 205 may be configured to receive data from mobile computing devices 100m indicating that a user is driving and where a user is driving. Based on the information received from the mobile computing device 100m and other information (e.g., information received from third party servers 203 or information stored in databases within or connected to the text message control servers 205), the text message control servers 205 may determine whether text messaging capabilities of the mobile computing device should be limited and send appropriate commands/instructions to the mobile computing device 100m accordingly.

In some embodiments, the text message control servers 205 may receive and store drive data on a driver-by-driver basis. For example, the text message control servers 205 may store drive data received from a first mobile computing device 100m in association with a driver associated with the first mobile computing device 100m, and store other drive data received from a second mobile computing device 100m in association with another driver associated with the second mobile computing device 100m. In this manner, the text message control servers 205 may have access to a driving behavior history of different drivers. The text message control servers 205 may include storage for storing this information or may be connected to local or remote databases used to store such information.

The text message control servers 205 may also store (or access databases that store) other insurance related information, such as information that may be associated with an insurance policy (e.g., automotive insurance policy, home insurance policy, etc.). For example, the text message control servers 205 may store or access insurance premiums, insurance deductibles, an insurance claim history, or accident reports as well as user information of an insurance policy, such as phone numbers of drivers on an insurance policy. In an aspect of the present disclosure, text messages from senders on the same insurance policy may be received, while text messages from others not on the same insurance policy may be blocked.

In some embodiments, the text message control servers 205 may also track participation in the text message control system and allocate rewards/discounts. The text message control servers 205 may maintain an account for each user or group of users (e.g., users of the same insurance policy) in order to keep track of rewards/discounts and/or actions that eventually may lead to rewards/discounts.

Figure 3:
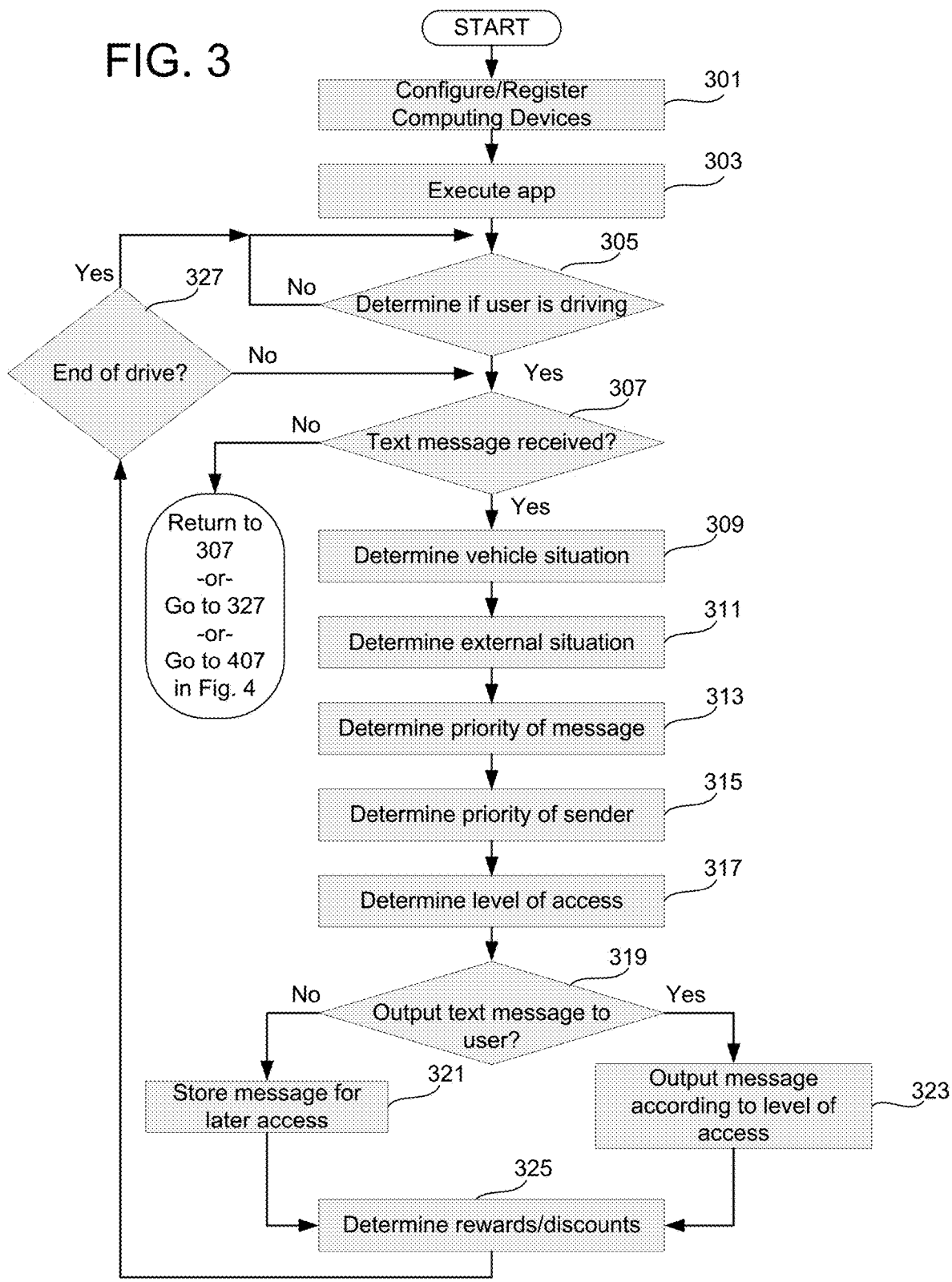
FIGS. 3-5 illustrate flow diagrams of example processes in accordance with aspects of the present disclosure.

FIG. 3 illustrates a flow diagram for an example method in accordance with aspects of the present disclosure. More specifically, FIG. 3 illustrates a plurality of steps of a method for controlling text messaging capabilities/features. The steps of FIG. 3 may be performed by various devices disclosed herein, and in particular a mobile computing device 100m, such as a cell phone of a driver of the vehicle 202. One or more of the steps of FIG. 3 may be performed by executing a client-side text message control program and/or operating a particularly configured computing device of the text message control system. As a result of the method of FIG. 3, text message capabilities/features may be controlled on-the-fly so that when mobile computing device 100m users are driving they might not have the full ability to send and receive text messages. Consequently, performance of the method of FIG. 3 may lead to a reduction in traffic accidents, which may lead to a reduction in costs of insurance companies, which in turn may translate into lower rates for customers of insurance companies.

The method of FIG. 3 may begin with a step 301 of configuring and/or registering the computing devices of the text message control system. For example, configuring a mobile computing device 100m of a customer of an insurance company may include downloading and installing a text message control program. Different mobile computing devices 100m may install different versions of the toll equipment program depending on a platform of the mobile computing device 100m. For example, a mobile computing device running the iOS™ operating system may download a different version of the toll equipment program than a device running the ANDROID™ operating system.

Step 301 may also include registering a computing device with the organization (e.g., an insurance company) providing the text message control system. Registering a computing device may include creating and/or logging into an account with an associated username and/or password. The account may be associated with the mobile computing device 100m and/or an insurance policy of a user of the mobile computing device 100m. To perform registration, the organization providing the insurance company may request various information, including information regarding a user device (e.g., device identifier, device make, device model, etc.), information regarding a user (e.g., name, birthdate, address, insurance policy number, etc.), and/or information regarding a vehicle (e.g., make, model, year, vehicle identification number (VIN), etc.). Registration may also include setting up an account for maintaining a record of rewards/discounts earned.

In some embodiments, when registering with the text message control system, a user may create a profile. The profile may include certain user preferences so that a customized experience may be realized. For example, a user may create settings that define whether and/or how limitations on text messaging will be applied. For example, a user may set up a schedule (including times and dates, such as weekdays during rush hour) defining when the user agrees to participate in the text message control system/service. A user may also set preferences to indicate priority levels for different senders. For example, a user may set preferences to indicate that text messages should always be received as usual from a certain person, but may be limited if they are sent from others. In some embodiments, a user may be able to create a certain size list of high priority people from which text messages should always be received. For example, a user may set preferences to indicate that text messages should not be blocked if the sender is the user's mother, father, or sister.

In step 303, the client-side text message control program installed on the mobile computing device 100m may be executed. Where the client-side text message control program is an "app" on a smartphone, step 303 may include a user selecting the "app" and the operating system of the smartphone running the "app." This client-side text message control program may be continuously run in the background of the mobile computing device 100m so that it is configured to limit text messaging capabilities whenever a user is the driver. In other words, the text message control program may run in the background of the mobile computing device 100m continuously so that users do not have to interact with the program each time they are about to begin a drive or end a drive. Because the client-side text message control program may run in the background it might not be distracting to users wishing to perform other operations with their mobile computing devices 100m, and therefore, users may be more likely to adopt the client-side text message control program. In some embodiments, once launched, the client-side text message control program may be launched automatically each time the mobile computing device 100m is powered on. Thus, if the mobile computing device 100m is turned off or its battery dies, the client-side text message control program may be automatically launched again when the mobile computing device 100m is turned back on or powered back up.

In some embodiments, the client-side text message control program may enter a sleep mode so as not to drain the battery of the mobile computing device 100m when the user is not driving. For example, in some embodiments, the client-side text message control may remain in a sleep mode to conserve battery power until a positive determination is made in step 305.

In step 305, a mobile computing device 100m (e.g., using the client-side text message control program) may determine whether a user is driving. The determination at step 305 may be automatic. For example, the mobile computing device 100m may automatically determine that the user is driving based on GPS coordinates (which may be provided by a GPS receiver of the vehicle computing device 100v, OBD device 206, or mobile computing device 100m itself). For example, if the GPS coordinates indicate that the mobile computing device 100m is on a road, it may be initially assumed that the user is a driver. Additionally, or alternatively, the mobile computing device 100m may automatically determine that the user is driving based on a speed associated with the mobile computing device 100m. This speed may be ascertained from the speedometer or accelerometer of a vehicle computing device, OBD device 206, or the mobile computing device itself. The speed may also be ascertained from two or more sets of GPS coordinates. Additionally, or alternatively, the mobile computing device 100m may automatically determine that the user is driving based on a user's proximity to the OBD device 206 or vehicle computing device 100v. If the mobile computing device 100m is located near the OBD device 206 or vehicle computing device 100v, it may be assumed initially that the user is driving. For example, the mobile computing device 100m may communicate with the OBD device 206 and determine that the mobile computing device 100m is located in the vehicle 202 that is associated with (e.g., belonging to or primarily driven by) a user of the mobile computing device 100m. In some examples, the mobile computing device 100m may be able to discern whether the user is a driver or passenger based on its relative distance from the OBD device 206 (e.g., where the OBD device 206 is located beneath the steering wheel, the closer the mobile computing device 100m is to the OBD device 206, the more likely the user associated with the mobile computing device 100m is the driver).

The determination in step 305 may also be manual. For example, the mobile computing device 100m may determine that a user is the driver based on a user input (audio or key/button entry). In some embodiments, the mobile computing device 100m may perform an automatic process to initially determine that the user might be the driver and then prompt the user to request an indication as to whether he indeed is driving. For example, the mobile computing device 100m may detect that the vehicle 100m is moving at a speed greater than 15 mph, and may play an audio recording asking the user to indicate whether the user is driving. The mobile computing device 100m may then record an audio response. If the user verbally states that he/she is the driver, the mobile computing device 100m may determine that the user is the driver based on recorded audio response.

As illustrated in FIG. 3, if the mobile computing device 100m determines that the user is not the driver, the process may return to step 305. Step 305 may be repeated to continuously or intermittently (e.g., periodically) monitor whether the user has begun driving. If the mobile computing device 100m determines that the user is the driver at step 305, the process may proceed to step 307.

At step 307, the mobile computing device 100m may determine whether a text message is received. The client-side text message control program may be configured to interface with another program on the same mobile computing device 100m that is used to receive and display text messages. If a text message is not received, the process may return to step 307 to continue to monitor whether a text message is received or go to step 327 to determine whether the user is still driving. In some embodiments, if it is determined that there is no incoming text message at step 307, steps in the method of FIG. 4 (described in further detail below) may be performed.

If a mobile computing device 100m determines that a text message is received while the user associated with the mobile computing device 100m is driving (Yes at step 307), step 309 may be performed. In step 309, the mobile computing device 100m may determine a vehicle situation (e.g., in-vehicle situation). For example, the mobile computing device 100m may determine a current situation in which the vehicle 202 that contains the mobile computing device 100m is involved. The determination at step 309 may be based on data provided by the vehicle 202 (e.g., OBD device 206 or vehicle computing device 100v) or the mobile computing device 100m. For example, a current speed of the vehicle, a speed of surrounding vehicles (as detected by sensors on the vehicle), a noise level in the vehicle 202, a number of passengers in the vehicle 202, a condition of the vehicle (e.g., low tire pressure and other information that may be obtained from vehicle sensors), recent drive data (e.g., hard-braking events, over-acceleration events, or sharp-turning events), and other information may be detected/collected at step 309 and used to determine a current situation of the vehicle 202 in step 309.

Step 309 may include calculating a score (e.g., a safety score) based on one or more criteria representing the current situation of the vehicle 202. For example, if the speed of the vehicle is relatively low (e.g., within the speed limit for the current road) and/or a noise level in the vehicle 202 is relatively quiet, a score for the vehicle situation may be low indicating a relatively safe situation and making it more likely that increased text messaging functionality will be permitted. In comparison, if the speed of the vehicle is relatively high and the radio in the vehicle 202 is loud, a score for the vehicle situation may be high indicating a relatively unsafe situation and making it more likely that text messaging functionality will be limited.

In step 311, the mobile computing device 100m may determine an external situation. For example, the mobile computing device 100m may determine a current situation surrounding the vehicle 202 that contains the mobile computing device 100m. The determination in step 311 may be based on data provided by third party servers 203 or text message control servers 205. The mobile computing device 100m may send a request for information to at least one of the one or more third party servers 203 or the one or more text message control servers 205. In some cases, multiple requests may be sent. A request may include location information indicating a location of the mobile computing device 100m. Such location information may include GPS coordinates or indicate a cell of a cellular network in which the mobile computing device 100m is located. In response to a request, a third party server 203 or text message control server may provide information appropriate for the location indicated in the request. For example, weather conditions, road conditions, traffic conditions, accident history for a current road, claim history for the current road, driving behavior information for the current road (based on driving data of all or a set of people), driving behavior information for the driver (based on past drive data collected for the user), and other information may be detected/collected at step 311 and used to determine a current situation of the vehicle 202 in step 311.

Step 311 may also include calculating a score (e.g., a safety score) based on one or more criteria representing the current situation external to the vehicle 202. For example, if weather information indicates it is sunny (or not raining) in the area of the vehicle 202 and/or accident history information indicates accidents are unlikely on the current road, a score for the external situation may be low indicating a relatively safe situation and making it more likely that increased text messaging functionality will be permitted. In comparison, if weather information indicates it's raining in the area of the vehicle 202 and/or accident history information indicates accidents are likely on the current road when it rains, a score for the external situation may be high indicating a relatively unsafe situation and making it more likely that text messaging functionality will be limited.

In some embodiments, the scores in steps 309 and 311 may be combined to produce a single safety score. In such embodiments, the weights given to the vehicle situation and external situation may be different. For example, the vehicle situation score may be weighted more heavily than the external situation score or vice versa. Also, in some embodiments, a single safety score may be computed based on a variety of factors representing a vehicle situation and/or external situation. For example, a single safety score may be calculated based on a speed of the vehicle 202 and the traffic conditions of the road on which the vehicle 202 is traveling.

In step 313, a priority of the incoming text message may be determined. In some embodiments, those sending text messages may be able to indicate a priority of the text message. For example, a sender of a text message may indicate that the text message is urgent or an emergency, and therefore, the text message may have a higher priority level. The higher the priority level is for a text message, the less likely access to the text message may be restricted or blocked. In some embodiments, there may only be two priority levels for a text message: regular priority or high priority. In other embodiments, there may be three or more priority levels (e.g., low, medium, or high) for a text message. In some embodiments, a priority score for the incoming text message may be determined.

In step 315, a priority of a sender of the incoming text message may be determined. As explained herein, users may indicate that certain senders should be given priority so that access to incoming text messages from such senders might not be restricted or blocked. For example, a daughter may indicate that high priority should be given to incoming text messages from her mother so that such text messages may be converted to speech and played while the daughter is driving. Also, a priority level of a sender may be automatically determined from evaluating an insurance policy. For example, an insurance policy may cover both a husband and wife and indicate both of their phone numbers so that a text message from the husband to the wife may be given high priority. In some embodiments, high priority may be given to all senders included in a contact list or address book of the mobile computing device 100m receiving the text message. The higher the priority level is for a sender of a text message, the less likely access to the text message may be restricted or blocked. In some embodiments, there may only be two priority levels (e.g., regular or high) for a sender of a text message based on whether they are on or off a list of priority senders. In other embodiments, there may be three or more priority levels (e.g., low, medium, or high) for different senders of a text message. For example, an unknown sender may be given low priority, a friend may be given medium priority, and a family member may be given high priority. Further, in some embodiments, a priority score associated with the priority level of a sender of the incoming text message may be determined.

In some embodiments, the scores in steps 313 and 315 may be combined to produce a single priority score. In such embodiments, the weights given to the message priority level and sender priority level may be different. For example, a score associated with the sender priority level may be weighted more heavily than a score associated with the priority level of the text message itself or vice versa. Also, in some embodiments, a single priority score may be computed based on the message priority level and sender priority level without first computing separate scores at steps 313 and 315.

In step 317, a level of access for the incoming text message may be determined. Determining the level of access may include determining whether an incoming text message may be received and/or how it may be received (e.g., displayed, converted to audio and played, or both). The level of access for the incoming text message may be determined based on a safety score(s) (as determined in steps 309 and/or 311), a priority of the incoming text message (as determined in step 313), and/or a priority of a sender of the incoming text message (as determined in step 315). In some embodiments, the level of access may be determined by determining an access score based on a safety score and a priority score. Also, in some embodiments, this access score may be compared with one or more thresholds to determine the access level.

In various embodiments, the different factors may be weighted differently in determining the level of access at step 317. For example, more weight may be given to a safety score than to the priority level of the message. Or, more weight may be given to a priority level of the sender than to the safety score. In some embodiments, one or more factors may trump all other factors in determining the level of access. For example, if it is determined that the driver is in a very unsafe situation, the incoming text message may be blocked or limited regardless of who the sender is or whether it is a high priority text message. Or, for example, if the sender is a particular person or the text message is an emergency/urgent, the incoming message may be output regardless of a safety level of the current driving situation.

In some embodiments, the determination of the level of access at step 317 may include determining whether the safety score is above a certain threshold and limiting or blocking access unless the incoming text message is a high priority and/or from a high priority sender. Alternatively, the determination may include determining whether the incoming message is a high priority and/or from a high priority sender and limiting or blocking access to the text message unless the safety score exceeds a certain threshold. The thresholds described herein may be manually set by a text message control system administrator (e.g., an employee of an insurance company) or mobile computing device 100m user or may be automatically set based on past evaluations of what thresholds work.

It should be understood that the order of steps 309-315 illustrated in FIG. 3 may be different in different embodiments. Also, the determination in one or more of steps 309-315 may result in skipping one or more of the remaining steps from 309-315. For example, step 315 may be performed first (e.g., upon receiving a text message) to determine if the sender of the incoming text message is a high priority sender. If so, in some examples, steps 309-313 may be skipped and the level of access may be determined to be a full access level so that the text message is immediately outputted. In this manner, an amount of processing may be reduced and certain incoming text messages may be output quickly. As a result, text messaging capabilities may be limited and a good user experience may be enjoyed by users thereby making it more likely for the text message control system to be adopted and/or effective.

As shown in FIG. 3, after determining a level of access at step 317, the mobile computing device 100m may determine how to handle the incoming text message at step 319. For example, step 319 may include determining whether to output the incoming text message to the user. The determination at step 319 may be based on the level of access determined at step 317.

If it is determined that the incoming text message is not to be outputted (No at step 319), the mobile computing device 100m (e.g., a client-side text message control program running thereon) may store the incoming text message for later access at step 321. For example, the incoming text message may be stored in RAM of the mobile computing device 100m so it may be provided to the user at a later time. In some embodiments, the incoming text message may be stored until the driving situation improves at which time the text message may be output. For example, if the incoming text message is received when the user is driving at a high speed in an area with a lot of traffic, the text message may be stored and output to the user when he/she slows down and/or traffic decreases. Alternatively, in some embodiments, the incoming text message may be stored until the drive is over. For example, if the incoming text message is received when the user is driving in a driving situation deemed to be unsafe, the text message may be stored and output to the user after the mobile computing device 100m determines that the user is no longer driving (e.g., the user stops driving or reaches a destination). In some embodiments, the mobile computing device 100m may make a chime, beep, or other sound or play an audio message indicating to the driver that an incoming message has been blocked and/or stored for later access.

If it is determined that the incoming text message may be outputted (Yes at step 319), the mobile computing device 100m (e.g., a client-side text message control program running thereon) may control output of the text message in accordance with the level of access at step 323. In some examples, the level of access may be full access, and the text message may be output as usual so that a user may access and read the incoming text message. In comparison, in some cases, the level of access may be less than full and may limit the user's ability to read the text message. For example, the client-side text message control program running on the mobile computing device 100m may prevent the user from reading the incoming text message. In some embodiments, the client-side text message control program may convert the incoming text message to speech (e.g., thereby creating an audio file) and play the speech for the driver to hear. In this manner, the driver might not attempt to read the incoming text message, and thus, might not become distracted from driving.

In some embodiments, a response text message may be automatically generated in response to the incoming text message at step 323. For example, if the user is driving in a possibly unsafe situation and an incoming text message is not urgent or from a priority sender, the client-side text message control program may cause the mobile computing device 100m to automatically generate a response text message that indicates that the user is driving and cannot currently access text messages (or non-urgent text messages). In some examples, the mobile computing device 100 may cause the response text message to be played for the driver to hear so the driver is informed that a response was sent. In some examples, prior to sending such a response text message, the mobile computing device 100m may require the driver to confirm by voice that the response text message may be sent.

Whether step 321 or 323 is performed, the process may proceed to step 325 as shown in FIG. 3. In step 325, the mobile computing device 100m may determine whether any rewards or discounts have been received for participating in the text message limiting service. Rewards or discounts may be provided to drivers in exchange for their willingness to allow access to text messaging capabilities to be restricted while driving. The rewards or discounts earned may be tied to the number of text messages that have been restricted or blocked. If rewards or discounts are earned, the mobile computing device 100m may notify the user. In some embodiments, the notification may be in the form of an audible tone, beep, chime, etc. or audible message played when access to a text message is limited to inform the driver that they have just received a reward. In some embodiments, in step 325, the mobile computing device 100m may transmit information indicating rewards/discounts earned to a text message control server 205. Also, in some embodiments, in step 325, the mobile computing device 100m might not determine the rewards/discounts itself, but may report a number of times access to incoming text messages have been limited to a text message control server 205, which may track rewards/discounts or actions that lead to rewards/discounts to determine whether rewards/discounts should be provided to the driver.

In step 327, the mobile computing device 100m (e.g., client-side text message control program executing thereon) may determine whether the drive has ended. This determination may be made by determining that the vehicle 202 has not moved for a while, by determining that the mobile computing device 100m has left the vehicle 202, and/or by determining that a speed of the mobile computing device has been below 15 mph for a while. If the drive has ended (Yes at step 327), the process may return to step 305. It should be understood that the process of FIG. 3 may be performed multiple times as a user may make multiple driving trips. If the drive has not ended (No at step 327), the process may return to step 307 as multiple incoming text messages may be received during a single driving trip. Also, when the drive ends, full access to text messaging capabilities may be restored.

It should be understood that the method of FIG. 3 is an example and that other methods with similar steps are contemplated. In such other methods, additional steps may be included or steps may be omitted. Also, other methods may change the order of any of the steps. For example, steps 309 and 311 may be performed before an incoming text message is received at step 307. That is, instead of performing steps 309 and 311 in response to receiving an incoming text message, these steps may be performed continuously or intermittently (e.g., periodically) so that a safety score of a current driving situation is already on hand to quickly determine whether access to a text message is permitted.

Figure 4:
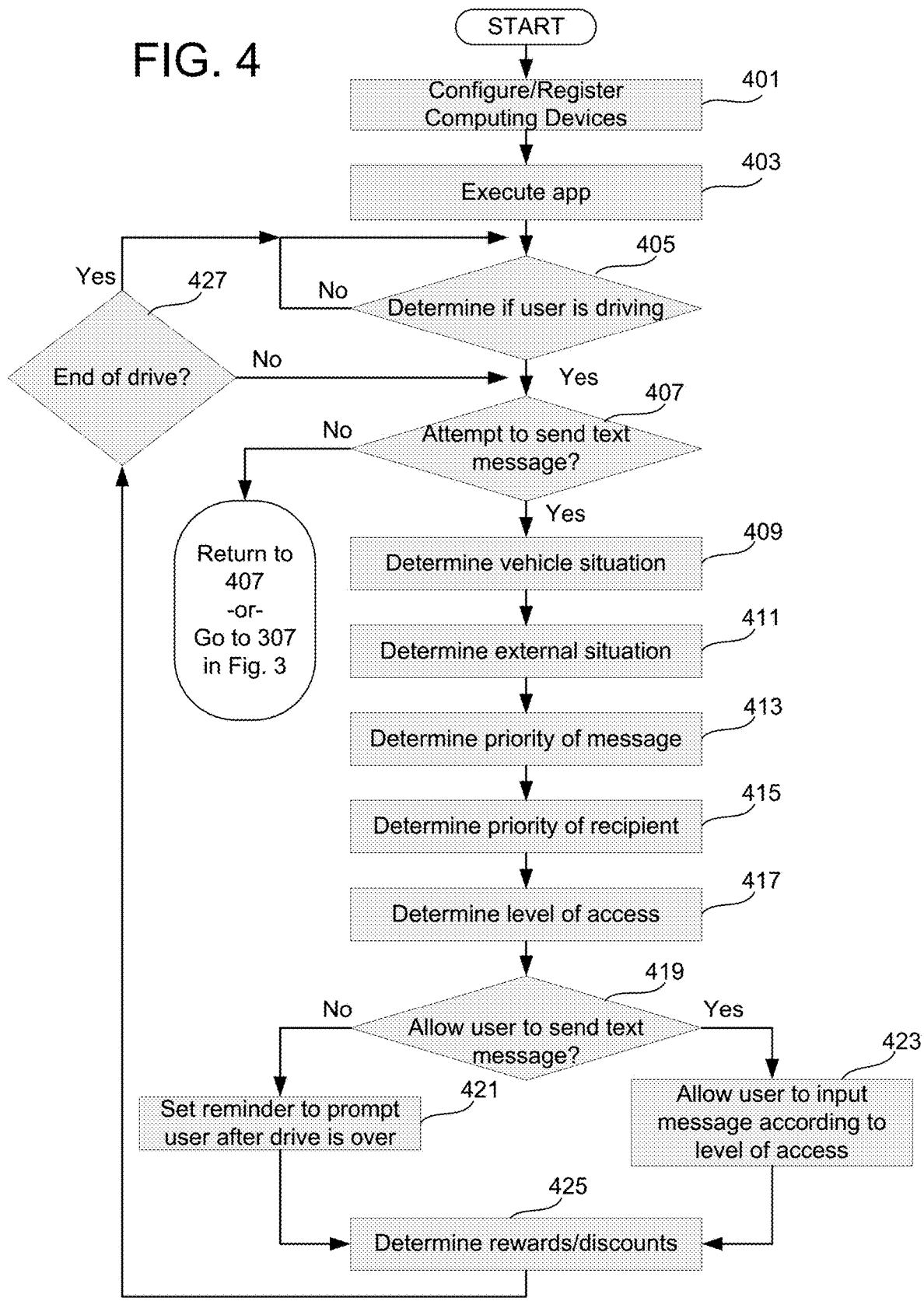

FIG. 4 illustrates a flow diagram for another example method in accordance with aspects of the present disclosure. More specifically, FIG. 4 illustrates a plurality of steps of a method for controlling text messaging capabilities/features. The steps of FIG. 4 may be performed by various devices disclosed herein, and in particular a mobile computing device 100m, such as a cell phone of a driver of the vehicle 202. One or more of the steps of FIG. 4 may be performed by executing a client-side text message control program and/or operating a particularly configured computing device of the text message control system. As a result of the method of FIG. 4, text message capabilities/features may be controlled on-the-fly so that when mobile computing device 100m users are driving they might not have the full ability to send and receive text messages.

Steps 401, 403, and 405 may be similar to steps 301, 303, and 305, respectively. Therefore, further description of steps 401, 403, and 405 will not be repeated here. If it is determined that the user is driving in step 405, the mobile computing device 100m (e.g., the client-side text message control program executing thereon) may determine whether the driver is attempting to send a text message using the mobile computing device 100m at step 407. For example, the mobile computing device 100m may detect when a user attempts to launch an "app" used to create or read text messages. In some embodiments, a positive determination at step 407 may be made in response to detecting speech from the driver that he/she wishes to send a text message. For example, the mobile computing device 100m may detect when a driver states "I want to send a text message" while driving.

In some embodiments, if no attempt to send a text message is detected at step 407, the process may return to step 407 to continue to monitor whether the user tries to send a text message. In some embodiments, if no attempt to send a text message is detected at step 407, the process may go to step 307 to determine whether any incoming text messages are received.

As shown in FIG. 4, if an attempt to send a text message is determined at step 407, the process may proceed to steps 409 and 411. Steps 409 and 411 may be similar to steps 309 and 311, respectively. In step 413, the priority of the message may be determined. This determination may be made based on an input from the driver. For example, the driver may state that he/she wants to send an urgent or emergency text message.

In step 415, the priority of the intended recipient may be determined. This determination may also be made based on an input from the driver. For example, the driver may state that he/she wants to send a text message to his/her mother and/or father, who may be considered high priority recipients.

In step 417, a level of access to text messaging capabilities/features may be determined. For example, the mobile computing device 100m (e.g., client-side text message control program) may determine a level of access to text messaging capabilities related to creating and sending text messages. Determining the level of access may include determining whether an outgoing text message may be created and sent and/or how it may be created and sent (e.g., whether typing is allowed or whether speech is to be converted into text). The level of access for the purpose of creating and sending text message may be determined based on a safety score(s) (as determined in steps 409 and/or 411), a priority of the intended outgoing text message (as determined in step 413), and/or a priority of an intended recipient of the outgoing text message (as determined in step 415). In some embodiments, the level of access may be determined by determining an access score based on a safety score and a priority score. Also, in some embodiments, this access score may be compared with one or more thresholds to determine the access level.

As shown in FIG. 4, after determining a level of access at step 417, the mobile computing device 100*m* may determine how to handle the driver's attempt to send an outgoing text message at step 419. For example, step 419 may include determining whether to allow the driver to create and send an outgoing text message. The determination at step 419 may be based on the level of access determined at step 417.

If it is determined that an outgoing text message is not allowed (No at step 419), in step 421, the mobile computing device 100*m* (e.g., a client-side text message control program running thereon) may set a reminder to prompt the user to send the text message after the drive is over. For example, a reminder may be stored in RAM of the mobile computing device 100*m* so it may trigger the mobile computing device 100*m* to present a prompt after the drive ends. In this manner, the user may be reminded to send the text message that he/she wanted to send while driving. In some embodiments, the mobile computing device 100*m* may make a chime, beep, or other sound or play an audio message indicating to the driver that an outgoing text message is not allowed.

If it is determined that the outgoing text message may be outputted (Yes at step 419), the mobile computing device 100*m* (e.g., a client-side text message control program running thereon) may control creation of the text message in accordance with the level of access at step 423. For example, depending on the level of access, a driver may only be allowed to create a text message by speaking. Accordingly, in step 423, the mobile computing device 100*m* (e.g., a client-side text message control program running thereon) may use its microphone or a microphone of the vehicle 202 to record the driver's speech. The mobile computing device 100*m* may then convert the recorded speech into text that may be sent in one or more text messages.

In some embodiments, the recorded speech may be played back to the driver for review prior to sending. Alternatively, the text may be converted into an audio message and played back to the driver for review prior to sending. After listening to such playback, the driver may give a command to indicate that the text message may be sent or may instruct the mobile computing device to record a new message and create a new text message (or edit the previously created message). Whether or not this confirmation step is performed may depend on the access level determined in step 417. For example, if the current driving situation is deemed unsafe this confirmation process might not be performed as it may be deemed too distracting to the driver.

Whether step 421 or 423 is performed, the process may proceed to step 425 as shown in FIG. 4. Step 425 may be similar to step 325 and thus is not described further here. After step 425, the process may proceed to step 427, which may be similar to step 327 of FIG. 3 and thus not described further here. If the drive has ended (Yes at step 427), the process may return to step 405. It should be understood that the process of FIG. 4 may be performed multiple times as a user may make multiple driving trips. If the drive has not ended (No at step 427), the process may return to step 407 as multiple attempts to create and send outgoing text messages may be received during a single driving trip. Also, when the drive ends, full access to text messaging capabilities may be restored.

Figure 5:
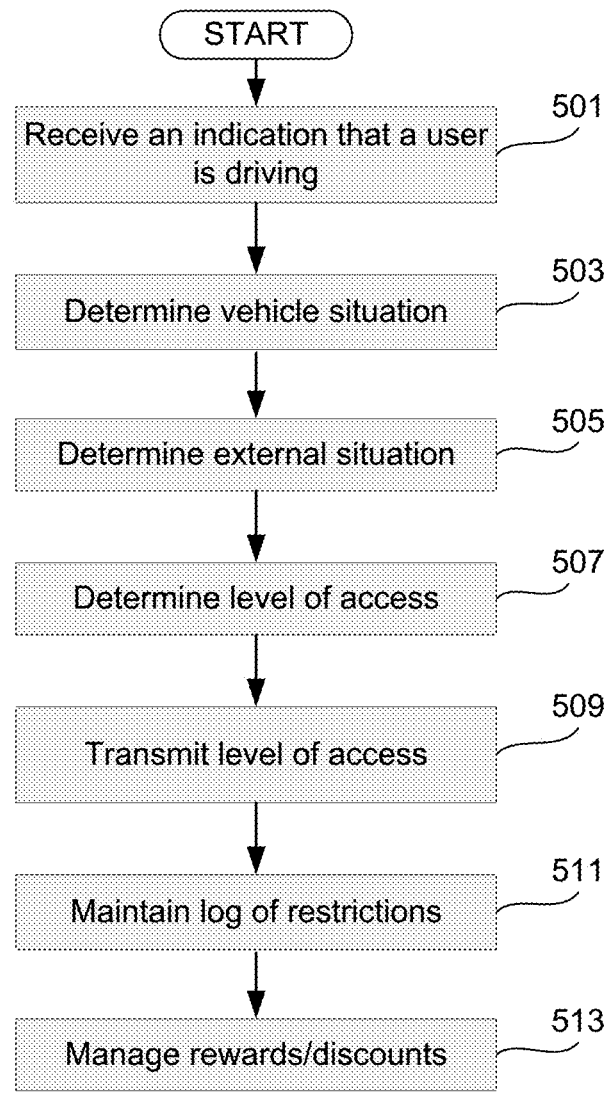

FIG. 5 illustrates a flow diagram for yet another example method in accordance with aspects of the present disclosure. More specifically, FIG. 5 illustrates a plurality of steps of a method for controlling text messaging capabilities/features. The steps of FIG. 5 may be performed by various devices disclosed herein, and in particular one or more text message control servers 205 and/or one or more service provider servers 204. One or more of the steps of FIG. 5 may be performed by executing a server-side text message control program and/or operating a particularly configured computing device of the text message control system. As a result of the method of FIG. 5, text message capabilities/features may be controlled on-the-fly so that when mobile computing device 100*m* users are driving they might not have the full ability to send and receive text messages.

The method of FIG. 5 may begin with a step 501 in which an indication that a user is driving is received. For example, a mobile computing device 100*m* may determine that its user is driving and may send a signal to a text message control server 205 informing the text message control server 205 that the user is driving. The signal received in step 501 may include location information (e.g., GPS coordinates) of the mobile computing device 100*m*. In some embodiments, multiple signals may be sent in step 501. For example, one signal may include the information indicating that the user is a driver, and another signal may indicate the current location of the driver.

In step 503, a situation of the vehicle 202 in which the mobile computing device 100*m* is located may be determined. The vehicle situation may be determined based on information obtained from the mobile computing device 100*m*, which may include information the mobile computing device 100*m* obtained from a vehicle computing device 100*v* (including vehicle sensors) and/or the OBD device 206. Step 503 may be similar to step 309 of FIG. 3.

In step 505, an external situation of the vehicle 202 containing the mobile computing device 100*m* may be determined. The external situation of the vehicle 202 may be determined based on information obtained from one or more third party servers 203 (e.g., weather information) and/or information obtained from one or more text message control servers 205 or databases connected thereto (e.g., insurance related information, such as past driving history). Step 505 may be similar to step 311.

In step 507, a level of access to text messaging capabilities/features may be determined based on the determinations made in steps 503 and 505. The level of access may be determined in a similar manner as the level of access determined in steps 317 and 417. For example, the level of access may depend on a current driving situation involving the vehicle 202 carrying the mobile computing device 100*m* for which the level of access is being determined. The level of access determined in step 507 may indicate whether incoming text messages, outgoing text messages, or both may be limited while driving and what the limitations are (e.g., limited to sending text messages using speech to text). In some embodiments, the level of access may also indicate whether voice confirmation/review is to be used before sending outgoing text messages. The levels of access may be represented by predefined values or other data structures. For example, a value of "0" may indicate no access to text messaging capabilities, while a value of "1" may indicate full access to text messaging capabilities.

In step 509, the level of access determined in step 507 may be transmitted. For example, a command/instruction including the level of access may be transmitted. The level of access may be transmitted to the mobile computing device 100m or to a device in the cellular network providing cellular service to the mobile computing device 100m. Once received by the mobile computing device 100m, the level of access may be used by the mobile computing device 100m (e.g., a client-side text message control program executing thereon) to determine whether to limit and how to limit text message capabilities. For example, if the level of access indicates that the current driving situation may be unsafe and incoming text messages should be blocked, the mobile computing device 100m may block any incoming text messages in accordance with the level of access received.

In step 511, a record of the command sent in step 509 may be stored in memory. In some embodiments, the text message control servers 205 may store a log of all access level commands sent. The log may associate the commands with the mobile computing device 100m that they were sent to.

In step 513, a text message control server 205 may determine whether any rewards or discounts should be awarded. For example, it may be determined that a driver has earned a reward because three commands have been sent to his/her mobile computing device 100m to restrict access to text messaging capabilities. The rewards or discounts awarded may be based on a number of commands sent and/or the type of commands sent. Drivers that are prevented from receiving or sending text messages may receive greater rewards than drivers that are only prevented from receiving text messages. Determining rewards/discounts in step 513 may be performed in a similar manner as steps 325 and 425.

In some embodiments, the text message control server 205 may manage accounts to track rewards and/or discounts for individual users or groups of users (e.g., users on the same insurance policy). The text message control servers 205 may host a website through which users may view their rewards and/or redeem them. Also, the text message control servers 205 may send notifications to mobile computing devices 100m regarding which rewards or discounts have been given as well as instructions on how to redeem them.

It should be understood that steps in FIG. 5 may be repeated multiple times during a single drive by a user so that the current driving situation may be ascertained in light of the realization that the safety of driving situations may change throughout a drive. For example, step 507 may be performed multiple times during a single drive by a user so that the level of access to text messaging capabilities may be dynamic (e.g., changed on-the-fly) throughout a drive. Further, it should be understood that the mobile computing device 100m may update the access level so that full text messaging capabilities/features may be restored. Such restoration may be triggered by a determination of the mobile computing device 100m itself or by an instruction received from another device of the system (e.g., a text message control server 205).

Figure 6:
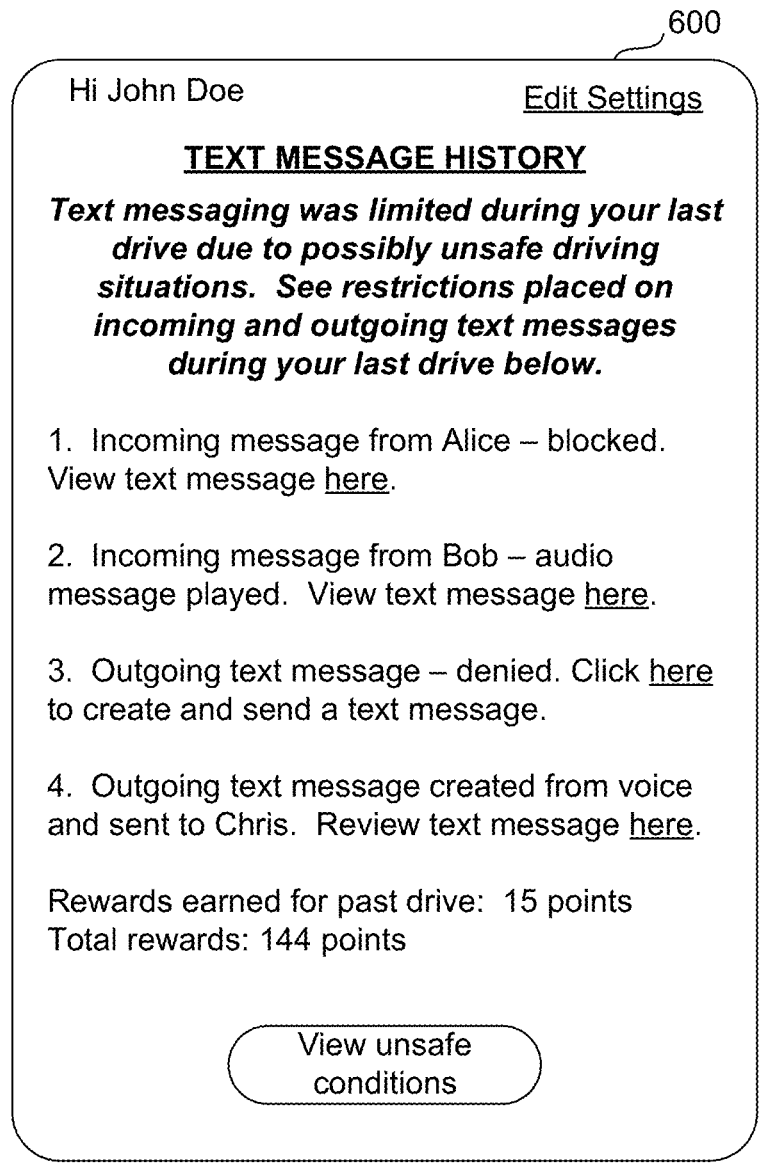
FIG. 6 illustrates an example interface that may be presented by computing devices configured according to aspects of the present disclosure.

FIG. 6 illustrates an example interface 600 in accordance with aspects of the present disclosure. This interface may be displayed on a screen of a mobile computing device 100m (e.g., a smartphone) after a user has finished driving (e.g., a drive trip has ended). It should be understood that the user interface 600 of FIG. 6 is intended to illustrate various features and aspects of the text message control system, and that interfaces are not limited to the visual appearance or layout depicted in FIG. 6.

As shown in FIG. 6, the interface 600 may include a message to a user (e.g., driver or passenger) of the mobile computing device 100m indicating that restrictions were placed on text messaging capabilities during a recent drive. Further, interface 600 illustrates that a history of the various restrictions that may have been implemented during the recent drive may be displayed to the user. For example, the interface 600 may indicate that an incoming text message was blocked. In some embodiments, the interface 600 may indicate who the sender of the blocked text message was. Further, the interface 600 may include a link so the user may readily access the text message that was blocked now that the user is no longer driving. Moreover, the interface 600 may also indicate that a text message was converted into speech and played for the user and may include a link to the text version for the user to view. In addition, the interface 600 illustrates that information regarding outgoing text messages may be displayed for the user to view as well. For example, if a text message was created from a user's speech during the recent drive, the interface 600 may provide a link to (or display) the text message that was sent based on the user's speech.

Interface 600 may also indicate rewards earned for the past drive as a result of participating in the service that limits/restricts text messaging. In addition, the interface 600 may also indicate a total number of rewards earned for participating in this service. By display such rewards or discounts, the interface 600 may encourage or incentivize participation in the service.

FIG. 6 also illustrates that the interface 600 may also include an option (e.g., virtual button) that a user may select to see the conditions that were determined to be unsafe and that led to the limitations/restrictions on text messaging capabilities. As such, a user may learn to appreciate the relative safety/unsafety of the driving situations he/she is driving in and how the limitations on text messaging may be beneficial.

Further, the interface 800 may also include an option to change settings. For example, the user may change settings related to priority levels of potential senders of incoming text messages.

Aspects of the invention have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the invention.

What is claimed is:

1. A system, comprising:
   a first Bluetooth interface associated with a first vehicle; and
   a second Bluetooth interface associated with a mobile computing device, wherein the mobile computing device is configured to:
   display a list of a plurality of Bluetooth devices previously paired with the mobile computing device, wherein the plurality of Bluetooth devices comprises the first Bluetooth interface associated with the first vehicle and at least one other Bluetooth interface associated with another vehicle;
   receive a user selection of the first Bluetooth interface from the list;
   generate, based on the user selection, a setting for discerning whether a user of the mobile computing device is a driver or only a passenger of the first vehicle, wherein the setting indicates that the user of the mobile computing device corresponds to the driver when the mobile computing device communicates with the first Bluetooth interface;

determine, based on a communication between the first Bluetooth interface and the second Bluetooth interface and based on the setting, that the user corresponds to the driver; and based on a determination that an incoming text message is received while the user corresponds to the driver:
block the incoming text message;
generate an outgoing text message to reply to the incoming text message; and
transmit the outgoing text message.

2. The system of claim 1, wherein the mobile computing device is further configured to:
generate a profile comprising the setting and at least one other setting.

3. The system of claim 1, wherein the mobile computing device is further configured to:
determine, based on a communication between the second Bluetooth interface and a third Bluetooth interface associated with a second vehicle and based on the setting, that the user of the mobile computing device is a passenger of the second vehicle.

4. The system of claim 1, wherein the mobile computing device is further configured to:
determine, based on a second communication between the second Bluetooth interface and a third Bluetooth interface associated with a second vehicle and based on the setting, that the user of the mobile computing device is not driving the second vehicle.

5. The system of claim 1, wherein the mobile computing device is further configured to:
after blocking the incoming text message, determine that the user of the mobile computing device is no longer driving the first vehicle; and
based on a determination that the user of the mobile computing device is no longer driving the first vehicle, output the incoming text message.

6. The system of claim 1, wherein the mobile computing device determines that the user corresponds to the driver by:
receiving, in the communication between the first Bluetooth interface and the second Bluetooth interface, information that indicates the communication involves the first Bluetooth interface; and
comparing the information with the setting.

7. The system of claim 1, wherein the mobile computing device is further configured to:
prior to blocking the incoming text message, determine who sent the incoming text message to determine a priority level of the incoming text message.

8. The system of claim 1, wherein the mobile computing device is further configured to:
convert the incoming text message to an audio file; and
output, via a speaker, the audio file.

9. The system of claim 1,
wherein the mobile computing device comprises:
a global positioning system receiver configured to obtain location information; and
a gyroscope configured to obtain acceleration data, and
wherein the mobile computing device determines that the user corresponds to the driver further based on at least one of the location information or the acceleration data.

10. The system of claim 1, wherein the mobile computing device is further configured to:
determine, based on a location of the mobile computing device, weather information, traffic information, or road condition information; and
block the incoming text message based on the weather information, the traffic information, or the road condition information.

11. A mobile computing device, comprising:
a first Bluetooth interface; and
one or more processors configured to cause the mobile computing device to:
display a list of a plurality of Bluetooth devices previously paired with the mobile computing device, wherein the plurality of Bluetooth devices comprises a second Bluetooth interface associated with a first vehicle and a third Bluetooth interface associated with a second vehicle;
receive a user selection of the second Bluetooth interface from the list;
generate, based on the user selection, a setting for discerning whether a user of the mobile computing device is a driver or only a passenger of the first vehicle, wherein the setting indicates that the user of the mobile computing device corresponds to the driver when the mobile computing device communicates with the second Bluetooth interface;
determine, based on a communication between the first Bluetooth interface and the second Bluetooth interface and based on the setting, that the user corresponds to the driver; and
based on a determination that an incoming text message is received while the user corresponds to the driver:
block the incoming text message;
generate an outgoing text message to reply to the incoming text message; and
transmit the outgoing text message.

12. The mobile computing device of claim 11, wherein the one or more processors are further configured to cause the mobile computing device to:
generate a profile comprising the setting and at least one other setting defining a schedule.

13. The mobile computing device of claim 11, wherein the one or more processors are further configured to cause the mobile computing device to:
determine, based on a second communication between the first Bluetooth interface and the third Bluetooth interface and based on the setting, that the user of the mobile computing device is not driving the second vehicle.

14. The mobile computing device of claim 11, wherein the one or more processors are further configured to cause the mobile computing device to:
receive, from a server remote from the mobile computing device, weather information, traffic information, or road condition information for a location of the mobile computing device; and
block the incoming text message based on the weather information, the traffic information, or the road condition information.

15. A method, comprising:
displaying, by a mobile computing device, a list of a plurality of Bluetooth devices previously paired with the mobile computing device, wherein the plurality of Bluetooth devices comprises a first Bluetooth interface associated with a first vehicle and at least one other Bluetooth interface associated with another vehicle;

receiving a user selection of the first Bluetooth interface from the list;

generating, based on the user selection, a setting for discerning whether a user of the mobile computing device is a driver or only a passenger of the first vehicle, wherein the setting indicates that the user of the mobile computing device corresponds to the driver when the mobile computing device communicates with the first Bluetooth interface;

determining, based on the setting and a communication between the first Bluetooth interface and the mobile computing device, that the user corresponds to the driver; and based on a determination that an incoming text message is received while the user corresponds to the driver:
blocking the incoming text message;
generating an outgoing text message to reply to the incoming text message; and
transmitting the outgoing text message.

16. The method of claim 15, further comprising:
determining, by the mobile computing device and based on the setting and a second communication between the mobile computing device and a second Bluetooth interface associated with a second vehicle, that the user of the mobile computing device is not driving the second vehicle,
wherein the setting does not identify the second Bluetooth interface.

17. The method of claim 15, further comprising:
determining, based on a location of the mobile computing device, traffic information,
wherein the blocking the incoming text message is based on the traffic information.

18. The method of claim 15, wherein the blocking the incoming text message is based on insurance claim data.

19. The method of claim 15, further comprising:
determining, based on an insurance policy of the user, a priority of a sender of the incoming text message,
wherein the blocking the incoming text message is based on the priority.

20. The method of claim 15, further comprising:
determining a safety score; and
comparing the safety score to a variable threshold,
wherein the blocking the incoming text message is based on the comparing.

* * * * *